March 3, 1959 C. E. HAJNY 2,875,975
VALVE DISC ASSEMBLY
Filed March 28, 1955

INVENTOR.
Charles E. Hajny
BY
Seegert & Schwalbach
Attys

United States Patent Office 2,875,975
Patented Mar. 3, 1959

2,875,975

VALVE DISC ASSEMBLY

Charles E. Hajny, Milwaukee, Wis., assignor to Baso Inc., Milwaukee, Wis., a corporation of Wisconsin Application March 28, 1955, Serial No. 497,056

10 Claims. (Cl. 251—86)

This invention relates in general to improvements in valve disc assemblies and more particularly to valve disc assemblies including a valve member having a noiseless pivotal mounting.

It has been standard practice in the art of controlling gaseous fuel flow to provide a pivotal connection between a valve member and a stem or arm on which it is mounted, so that when the valve member is moved to closed position it can adjust itself to the valve seat. This is particularly desirable where the valve member is carried by a swinging arm. In prior art devices, particularly those in which an operator is energized by alternating current, a vibration may be set up producing a chattering noise in the aforementioned pivotal connection between the valve stem and the valve member. This noise is prticularly obnoxious when such devices are installed in dwellings or commercial establishments where it interferes with the comfort or efficiency of the inhabitants.

It is a general object of the present invention to provide an improved valve disc assembly comprising an improved valve member and pivotal mounting means which affords noiseless operation.

Another object of the invention is to provide a valve disc assembly of the aforementioned character which employs cushioning means between all of the cooperating surfaces of the valve member and mounting means to prevent direct contact thereof.

Another object of the invention is to provide an improved valve disc assembly of the type described wherein the valve member is pivotally carried by a valve stem having a bearing end surface and shoulder means, said valve member having a resilient bearing surface cooperable with said stem end and having resilient shoulder means overlapping the shoulder means on said stem to retain said valve member and stem in assembled relation while permitting pivotal movement therebetween.

Another object of the present invention is to provide an improved valve disc assembly of the aforementioned character wherein the valve member is provided with a unitary resilient sealing and cushioning member of molded material having portions on opposite sides of said valve member to provide both a resilient sealing face and a resilient bearing surface for the valve stem.

Another object of the invention is to provide a valve disc assembly of the character described wherein the valve member has a layer of resilient material bonded to the face thereof, there being a peripheral surface on said valve member normal to said valve face and to which said layer is bonded, said peripheral bond reinforcing the bond between said layer and valve face.

Another object of the invention is to provide a valve disc assembly of the character described wherein the layer of resilient material on the valve member face is formed with an opening exposing a portion of said valve member face to permit said exposed surface to be directly engaged by a cooperating member to provide, for example, low frictional engagement therebetween.

Another object of the invention is to provide a valve disc assembly of the aforementioned character wherein the portion of the valve member face exposed within the opening in the resilient layer is offset inwardly from the surface of said resilient layer to permit grinding of said layer surface without simultaneously grinding of said valve member within said opening.

Another object of the invention is to provide a valve member and mounting therefor which is inexpensively constructed of a relatively small number of parts which are well adapted for mass production manufacture.

The novel features that I consider characteristic of my invention are set forth with particularity in the appended claims. The invention itself, however, both as to its organization and its method of operation, together with additional objects and advantages thereof will best be understood from the following description of specific embodiments when read in connection with the accompanying drawings in which:

While the invention may take a number of forms, the forms of the invention selected for illustration are of the type which is particularly well adapted for use with a line-powered electromagnetic operator in the control of gaseous fuel.

Figure 1:
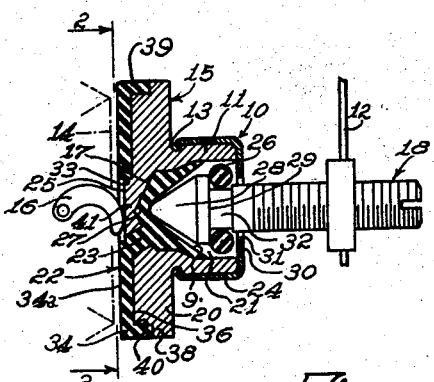
Figure 1 is a side elevational view of the improved valve disc assembly, partially in axial section and showing a cam member engaging the valve member of said assembly, a cooperating valve seat being indicated schematically in dot and dash lines.

Referring more particularly to Figure 1 of the drawing, the numeral 10 indicates the improved valve disc assembly which comprises, the valve member 15 pivotally mounted on the valve stem 18, and carried by an arm 12 which may form a part of electromagnetic operator (not shown) for movement of said valve member toward and away from a valve seat, for example the annular valve seat 14 indicated schematically in dot and dash lines in Figure 1.

The stem 18 is formed with an enlarged head 28 which is preferably generally conical in shape and has a rounded apex affording a bearing surface. The stem 18 is formed with a groove or portion of reduced diameter 32 immediately adjacent to the head 28 to provide with said head an anular surface or shoulder 29. The groove 32 is adapted to receive a cushion member 26 which may take the form of an O-ring of resilient material for example rubber. The O-ring cushion 26 is formed so that the inner diameter thereof is slightly smaller than the diameter of the groove 32, thereby providing a snug fit.

The radial thickness of the O-ring 26 is substantially double the radial dimension of the annular surface or shoulder 29 so that the center of the cross-sectional area of the O-ring 26 viewed in Figure 1 and the peripheral edge of the shoulder 29 are equally spaced from the axis of the stem 18. This relationship tends to prevent radial stretching of the O-ring and removal thereof from the groove 32 when said shoulder and O-ring are biased toward each other with substantial force.

The illustrated valve member 15 comprises a metal disc 20 having a projecting generally cylindrical hub 11. The hub 11 is formed with an axial stem receiving recess 21 which extends into the disc 20 and terminates in a bottom surface 17. The recess 21 is large enough to loosely accommodate the conical stem head 28 with the O-ring 26 thereon. The hub 11 is formed with a peripheral groove 13 at the base thereof to receive the inturned lip of a cup-shaped retaining member 24 which may take the form of a metal stamping telescoped over the hub 11 as shown.

The bottom wall 30 of the cup-shaped retainer 24 is formed with coaxial hole 31 which has a diameter slightly larger than that of the portion of the stem 18 projecting therethrough and slightly smaller than the outer diameter of the annular surface or shoulder 29 on the stem head 28, wherefore said stem head is prevented by said retaining member from being withdrawn from the recess 21. The bottom wall 30 of the retainer 24 may be normal to the axis of the stem 18 and provides an annular retaining shoulder which overlaps the annular shoulder 29 of the valve stem head, said overlapping shoulders being prevented from direct contact with each other by the O-ring 26.

The O-ring 26 projects radially from the stem 18 a greater distance than any portion of the stem head 28 and thereby prevents contact of said head and the side wall of the recess 21. The gap between the O-ring and the side wall of the recess 21 is smaller than the corresponding gap between the stem 18 and the margin of the hole 31 in the retaining member 24 whereby the stem is prevented from contacting said retainer.

The valve member 15 is provided with a unitary sealing and cushioning member 22 of resilient material, for example molded synthetic rubber, said member having a cushion portion 27 disposed within the recess 21. The cushion portion 27 may be provided with the conical bearing surface 9 having a rounded apex, and having a greater angularity than the angularity of the conical surface of the stem head. The apex of the stem head 28 is adapted to bear against the rounded apex of the conical bearing surface 9 to permit pivotal tilting movement of the valve member 15 about said apexes. The cushion member 27 affords a cushion between the valve disc 20 and the stem head 28 preventing direct contact therebetween, and the angularity of the conical bearing surface 9 being greater than the conical surface of the stem head 28 provides sufficient clearance for the aforementioned pivotal movement.

The valve disc 20 has an annular end face 36, and the unitary sealing and cushioning member 22 has a sealing portion 34 comprising an annular layer overlying said end face and having a sealing face 34a adapted for coaction with the valve seat 14. Within the annular end face 36 the disc 20 is formed with a projection 41 which is preferably cylindrical and coaxial with said disc, said projection having an end face 25 and an annular side wall or shoulder 33 with which the annular inner edge surface of the layer 34 is in abutment. The periphery of the disc 20 is preferably cut away to provide a coaxial cylindrical edge surface or shoulder 40 and an annular end face 38 parallel to the surface 36 and offset axially therefrom. The sealing layer 34 is formed with an annular peripheral flange portion 39 overlying the cylindrical shoulder 40 and having edgewise abutment with the end face 38.

The sealing layer 34 is preferably bonded to the surfaces of the disc 20 with which it is in contact, i. e. the annular end faces 36 and 38 and the cylindrical shoulders 33 and 40. The structural relationships between the valve disc 20 and the layer 34 prevents peeling of said layer away from said disc since no peeling action can start without first shearing a bond at a peripheral portion of said layer. Since bonds of the type disclosed have extremely high shear strength, the possibility of peeling of the layer 34 is substantially eliminated.

An opening 23 may be formed in the valve disc 20 to afford a passageway between the bottom surface 17 of the recess 21, end faces 25 and 36. The portions 27 and 34 of the unitary sealing and cushioning member 22 are joined in the opening 23 as shown, permitting said member to be formed in a single molding operation. As shown in Figure 1, the opening 23 is eccentric to the apex 9 of the cushion 27, so that when the stem head bears axially against said cushion the latter does not tend to be forced through said opening. This relationship is especially desirable in small valve assemblies where the radius of the rounded apex of the stem head 28 is smaller than the radius of the opening 23.

The end face 25 provides the valve member 15 with an exposed end face of material which is hard and has low friction as compared with the resilient layer 34, said end face being adapted for engagement by a coacting member, for example an actuating cam 16. The thickness of the layer 34 is greater than the axial dimension of the shoulder 33, thus affording the exposed end face 25 a recessed position relative to the sealing surface 34a. Recessing of the end face 25 as described permits grinding of the sealing face 34a without contact of the grinding means with said end face.

The improved valve assembly affords noiseless operation because any vibration transmitted from the energized operator via the arm 12 does not produce noise by virtue of the cushions preventing all metal to metal contact.

Figure 2:
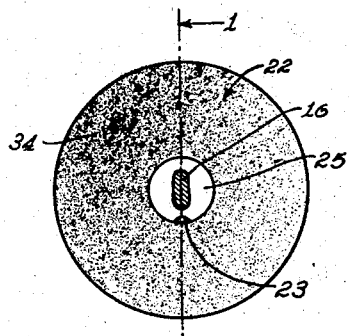
Figure 2 is a vertical sectional view of the improved valve disc assembly taken along the line 2—2 of Figure 1.
Figure 4:
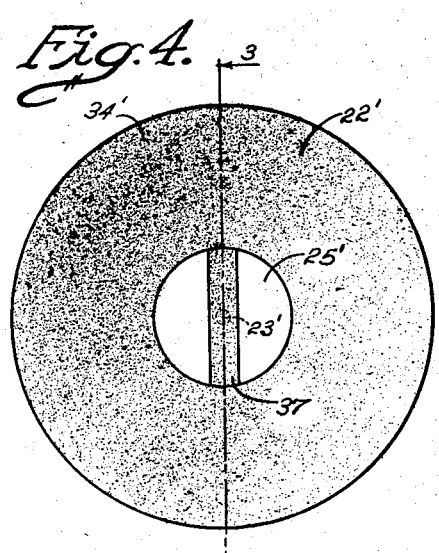
Figure 4 is a front elevational view of the valve member shown in Figure 3.
Figure 3:
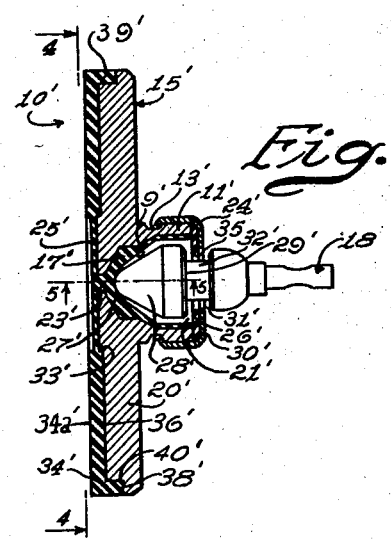
Figure 3 is a side elevational view similar to Figure 1 and showing a modified form of valve disc assembly.
Figure 5:
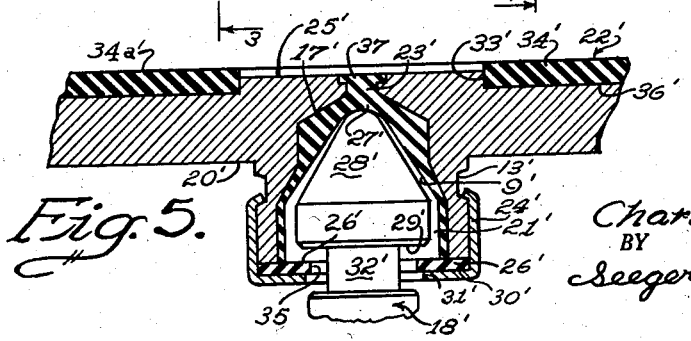
Figure 5 is an enlarged fragmentary sectional view taken along the line 5—5 of Figure 3.

Figures 3 through 5 of the drawing show a modified form of the invention which is similar in most respects to the form of the invention shown in Figures 1 and 2. The parts indicated by the primed numerals in Figures 3 through 5 correspond to similar parts in Figures 1 and 2 indicated by the same numerals unprimed. As shown in Figures 3 and 5, the stem groove 32' extends through and terminates on the outside of the retaining member 24'. The stem bearing cushion 27' completely lines the wall surface of the recess 21' and prevents the head 28' from contacting said wall surface. A cushion washer 26' caps the projecting hub 11' and is clamped in operative position against said hub by the retaining member 24'. The hole 35 in the cushion washer 26' is larger than the outer surface of the groove 32' but is smaller than the hole 31' in the retainer 24'. This relationship affords noiseless pivotal movement of the valve member 15' with respect to stem 18'.

The opening 23' through which the portions 27' and 34' of the member 22' are joined is coaxial with the apex of the stem cushion 27', but since the rounded apex of the stem head 28' has a large relative radius size to said opening, said cushion does not tend to be forced through said opening. A saw slot or groove 37 may bisect the end surface 25' and afford communication between the opening 23' and the cylindrical wall or shoulder 33' to facilitate molding of the unitary sealing and cushioning member 22' while retaining the end face 25' exposed for engagement by a coacting member (not shown).

Although I have shown and described certain specific embodiments of my invention, I am fully aware that many modifications thereof are possible. My invention, therefore, is not to be restricted except insofar as is necessitated by the prior art and by the spirit of the appended claims.

What is claimed as the invention is:

1. In combination, a valve member having oppositely facing first and second surfaces and having an opening affording communication between said surfaces, and a unitary sealing and cushioning member of resilient material having a first portion overlaying a part of said first valve member surface and having a sealing face, a second part of said first valve member surface being free of resilient material and adapted to permit coaction with a hard surface, said unitary resilient member also having a second portion overlying said second valve member surface and affording a resilient valve stem bearing, said first and second resilient member portions being joined within said opening.

2. In combination, a valve member having a first centrally disposed end face, a substantially coaxial annular second end face offset axially from said first end face to provide a first axially extending annular shoulder therebetween, and a substantially coaxial annular third end face offset axially from said second end face to provide a second axially extending annular shoulder therebetween, and a resilient valve facing comprising an annular layer of resilient material overlying said second end face and having an annular inner edge surface bonded to said first annular shoulder, said facing also comprising an axially directed annular peripheral flange overlying and bonded to said second annular shoulder, said annular layer having a thickness greater than the axial dimension of said first annular shoulder whereby the outer surface of said layer is offset outwardly from said first valve end face, the latter being exposed to permit engagement by a coacting member.

3. A noiseless valve disc assembly comprising, a metal valve member having oppositely facing first and second surfaces, said second surface being shaped to provide a stem receiving recess, said valve member also having an opening affording communication between said surfaces, a valve stem having a head pivotally disposed within said recess and having a shoulder, a unitary sealing and cushioning member of resilient material having a first portion overlying a first part of said first valve member surface and having a sealing face, a second part of said first valve member surface being exposed to permit low frictional coaction therewith of a coacting member, said unitary member also having a second portion overlying said second valve member surface and affording a resilient bearing for said stem head, said first and second portions being joined within said opening, a retaining member carried by said valve member and having a shoulder overlapping said stem shoulder and coacting therewith to provide retention of said valve member and stem in assembled relation while permitting relative tilting movement of said stem and valve member, and a resilient cushion disposed between said retaining member shoulder and said stem shoulder to prevent direct contact thereof.

4. A noiseless valve disc assembling comprising, a valve member having oppositely facing first and second surfaces, said second surface being shaped to provide a stem receiving recess, said valve member also having an opening affording communication between said surfaces, a valve stem having an end pivotally disposed within said recess, said stem having a shoulder, a unitary sealing and cushioning member of resilient material having a first portion overlying said first valve member surface and having a sealing face, said unitary member also having a second portion overlying said second valve member surface and affording a resilient bearing for said stem end, said first and second resilient member portions being joined within said opening, a retaining member carried by said valve member and having a shoulder overlapping said stem shoulder and coacting therewith to provide retention of said valve member and stem in assembled relation while permitting relative tilting movement of said stem and valve member, and a resilient cushion disposed between said retaining member shoulder and said stem shoulder to prevent direct contact thereof.

5. In combination, a valve member having a first centrally disposed end face, a stem receiving recess having a surface formed in said valve member on the side opposite from said end face, an opening affording communication between said first end face and said recess surface, a substantially coaxial annular second end face offset axially from said first end face to provide a first axially extending annular shoulder therebetween, and a substantially coaxial annular third end face offset axially from said second end face to provide a second axially extending annular shoulder therebetween, and a resilient unitary sealing and cushioning member comprising a first portion bonded to said recess surface and affording a valve stem bearing, a second portion of said member comprising an annular layer overlying said second end face and having an annular inner edge surface bonded to said first annular shoulder, said second portion also comprising an axially directed annular peripheral flange overlying and bonded to said second annular shoulder, said first and second portions being joined in said opening, and said first valve end face being exposed to permit engagement thereof by a coacting member.

6. A noiseless valve disc assembly comprising, a valve member having a sealing surface and an oppositely facing bearing surface, said valve member also having an opening affording communication between said surfaces, a valve stem cooperable endwise with said bearing surface, unitary sealing and cushioning means comprising a body of resilient material having a sealing portion overlaying said sealing surface and having a cushioning portion overlaying said bearing surface and disposed between said bearing surface and stem end to prevent direct contact of said stem end with said bearing surface, said sealing and cushioning portions being joined within said opening, cooperating shoulders on said stem and valve member for maintaining said valve member and stem in assembled relation, and cushion means disposed between said cooperating shoulders for preventing direct contact of said stem and valve member.

7. A noiseless valve disc assembly comprising, a valve member having a sealing surface and an oppositely facing cup-shaped stem receiving recess, said valve member also having an opening affording communication between said sealing surface and said recess, a valve stem having an end portion disposed within said cup-shaped recess, resilient unitary sealing and cushioning means comprising a body of resilient material having a sealing portion overlaying said sealing surface and having a cup-shaped cushioning portion overlaying the inner surface of said cup-shaped recess and interposed between said stem end portion and said valve member to prevent direct contact of said stem end and valve member, said sealing and cushioning portions being joined within said opening, cooperating shoulders on said valve member and stem for retaining said valve member and stem in assembled relation, and resilient cushioning means interposed between said cooperating shoulders for preventing direct contact of said stem and valve member.

8. A noiseless valve disc assembly comprising, a valve member having a sealing surface and an oppositely facing concave bearing surface, said valve member also having an opening affording communication between said surfaces, a valve stem for pivotal connection with said valve member and having a rounded tip portion, said tip portion being cooperable endwise with said concave bearing surface, unitary sealing and cushioning means comprising a body of resilient material having a sealing portion overlaying said sealing surface and having a cushioning portion overlaying said concave bearing surface and disposed between said bearing surface and said stem tip portion to prevent direct contact of said tip portion with said bearing surface, said sealing, and cushioning portions being joined within said opening, cooperating shoulders on said stem and said valve member for maintaining said valve member and stem in assembled relation while permitting limited tilting movement therebetween, and cushioning means disposed between said cooperating shoulders for preventing direct contact of said stem and said valve member.

9. A noiseless valve disc assembly comprising, a valve member having a sealing surface on one side and having a hub on an opposite side formed with an axial stem receiving recess, said valve member also having an opening affording communication between said sealing surface and said recess, a valve stem formed with a substantially conical end portion having a rounded tip pivotally disposed within said recess, said stem also having a shoulder, unitary cushioning and sealing means comprising a body of resilient material having a sealing portion overlaying said sealing surface and having a cushioning portion overlaying the inner surface of said recess to provide a bearing surface for endwise engagement of said rounded tip, said sealing and cushioning portions being joined within said opening, a retaining member carried by said hub and having a shoulder overlapping said stem shoulder and coacting therewith to provide retention of said valve member and said stem in assembled relation and permit relative tilting movement of said stem and said valve member, and a resilient cushion disposed between said retaining member shoulder and said stem shoulder, said sealing and cushioning means and said resilient cushion preventing direct contact of said valve member and said stem.

10. In combination, a valve member having a sealing surface and an oppositely facing concave bearing surface, said valve member also having an opening affording communication between said surfaces, and a unitary sealing and cushioning member of resilient material having a first portion overlaying said sealing surface and having a sealing face, said unitary member also having a second portion overlaying said concave bearing surface and affording a resilient concave valve stem bearing face adapted for endwise abutment by a valve stem, said first and second resilient member portions being joined within said opening.

References Cited in the file of this patent

UNITED STATES PATENTS

| 140,006 | Brown | June 17, 1873 |
| 1,526,248 | Small | Feb. 10, 1925 |
| 2,035,533 | Campbell | Mar. 31, 1936 |
| 2,077,766 | Mead | Apr. 20, 1937 |
| 2,081,462 | McClure | May 25, 1937 |
| 2,194,960 | Walker | Mar. 26, 1940 |
| 2,233,649 | Stahl | Mar. 4, 1941 |
| 2,312,290 | Smith | Feb. 23, 1943 |
| 2,457,492 | Raybould | Dec. 28, 1948 |

FOREIGN PATENTS

| 42,837 | Austria | Feb. 10, 1910 |
| 246,631 | Great Britain | Feb. 4, 1926 |
| 634,353 | Great Britain | Mar. 22, 1950 |
| 77,154 | Denmark | Feb. 8, 1954 |